No. 825,853. PATENTED JULY 10, 1906.
W. MAYNE.
REVERSING VALVE FOR FLUID PRESSURE MOTORS.
APPLICATION FILED JUNE 2, 1903.
3 SHEETS—SHEET 1.
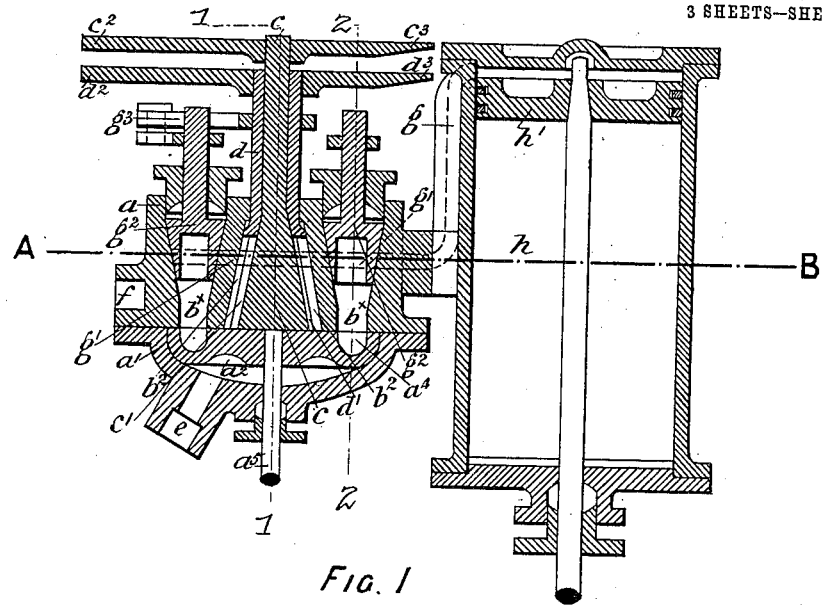
Fig. 1
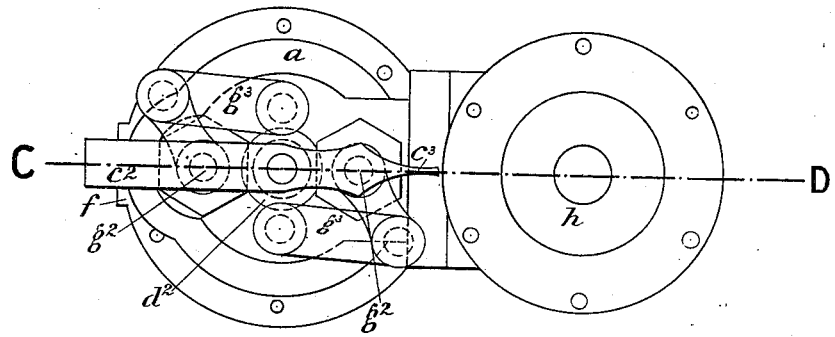
Fig. 2
WITNESSES
INVENTOR
William Mayne
ATTORNEYS
THE NORRIS PETERS CO., WASHINGTON, D. C.

No. 825,853. PATENTED JULY 10, 1906.
W. MAYNE.
REVERSING VALVE FOR FLUID PRESSURE MOTORS.
APPLICATION FILED JUNE 2, 1903.
3 SHEETS—SHEET 2.
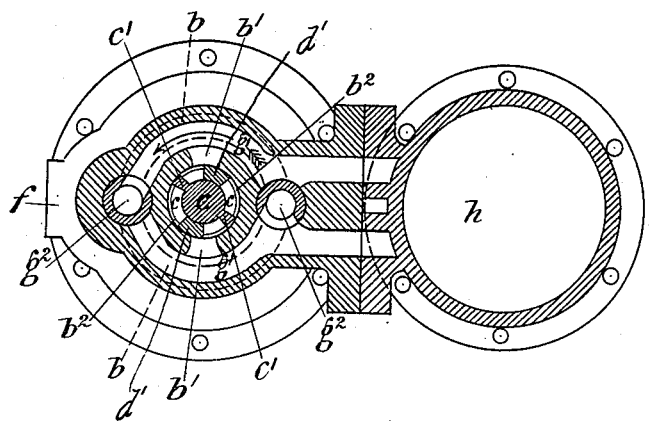
FIG. 3.
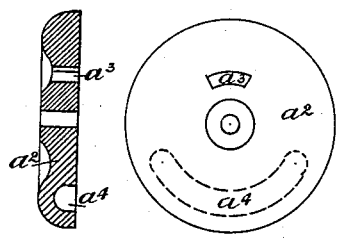
FIG. 4.
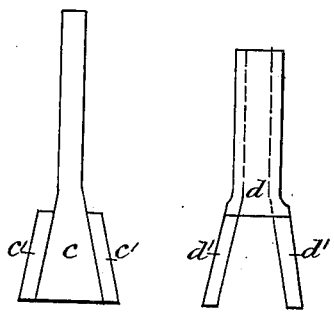
FIG. 6. FIG. 7.
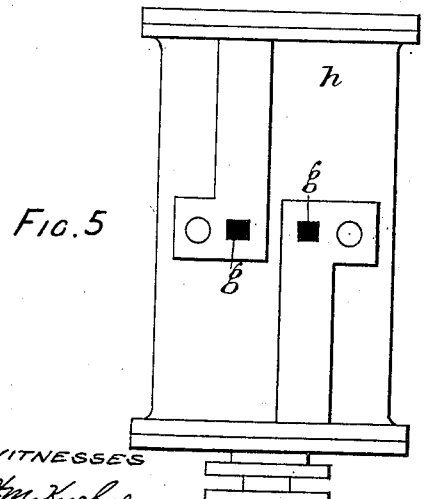
FIG. 5.
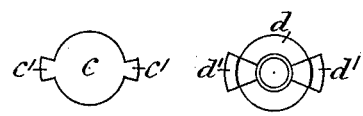
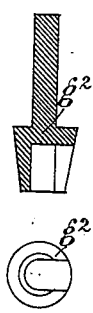
FIG. 8.
WITNESSES
INVENTOR
William Mayne
BY
ATTORNEYS No. 825,853. PATENTED JULY 10, 1906.
W. MAYNE.
REVERSING VALVE FOR FLUID PRESSURE MOTORS.
APPLICATION FILED JUNE 2, 1903.
3 SHEETS—SHEET 3.
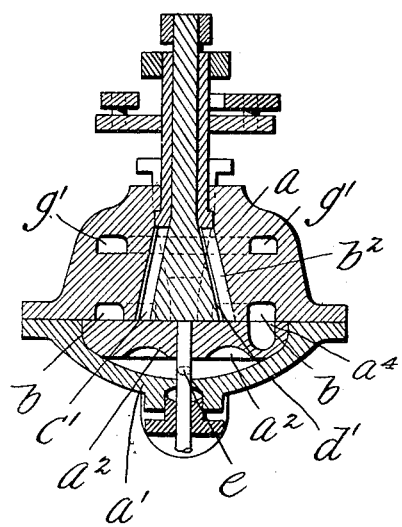
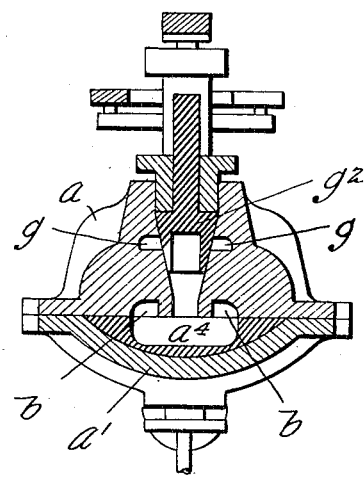
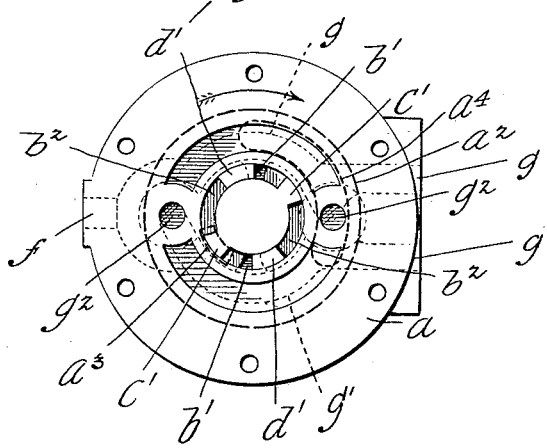

UNITED STATES PATENT OFFICE.

WILLIAM MAYNE, OF MILDURA, VICTORIA, AUSTRALIA.

REVERSING-VALVE FOR FLUID-PRESSURE MOTORS.

No. 825,853.   Specification of Letters Patent.   Patented July 10, 1906.

Application filed June 2, 1903. Serial No. 159,812.

*To all whom it may concern:*

Be it known that I, WILLIAM MAYNE, engineer, a subject of the King of Great Britain and Ireland, and a resident of Karadoc avenue, Mildura, in the county of Karkarooc, in the State of Victoria, in the Commonwealth of Australia, have invented a certain new and useful Improved Reversing - Valve for Fluid - Pressure Motors by which the points of admission, cut - off, and release of high-pressure steam or other motive fluid may be controlled, of which the following is a specification.

The objects of my invention are to arrange the mechanism of the valves that steam may be cut off at any desired point of stroke of piston and that the engine may be reversed in a simple and efficient manner without the use of eccentrics, links, weigh-bar, shaft, and the like.

Instead of the ordinary valve-chest I substitute a special form of circular valve-chest with a conical chamber above it. A disk valve works in the circular valve-chest and two conical valves in the conical chamber, both being capable of adjustment. An improved system of exhaust is also provided by an annular port fitted with two two-way cocks.

In order that my invention may be clearly rendered, reference may be had to the accompanying drawings, in which—

Figure 1 is a sectional vertical view of a cylinder $h$ with piston $h'$, showing my rotary disk valve $a^2$ with outer hollow plug-valve $d$, inner solid plug-valve $c$, and the two reversing-cocks $g^2$. Fig. 2 is a plan of the cylinder $h$ and valve-box $a$. Fig. 3 is a horizontal section on the line A B, Fig. 1. Fig. 4 is a plan and section of the disk valve $a^2$. Fig. 5 is an elevation of the cylinder $h$, showing the manner of arranging the ports $g$ on the cylinder. Fig. 6 is a plan and elevation of the solid plug-valve $c$. Fig. 7 is a plan and elevation of the hollow plug-valve $d$. Fig. 8 is a plan of the hollow end of reversing-cock $g^2$, together with a sectional elevation of same. Fig. 9 is a plan of the valve-face on which the disk valve $a^2$ works. Fig. 10 is a vertical section through the line 1 1, Fig. 1. Fig. 11 is a similar section through line 2 2 in Fig. 1.

In constructing valve-gear according to my invention I employ the disk valve $a^2$, provided with port-hole $a^3$ and exhaust-recess $a^4$ in its working face, said recess being for the release of steam to the exhaust $f$. The disk valve $a^2$ rotates in the circular box $a$ and is fitted with a shaft $a^5$ and operated from the main shaft by suitable gearing. Steam or other motive fluid is supplied to the valve-box $a$ through the pipe $e$. A conical chamber $b^2$ is formed above the face on which the disk $a^2$ works, said chamber being shown in Fig. 1 occupied by the plug-valves $c$ and $d$. The steam-ports $g$ $g$ lead to and from said chamber by the passages $g'$. The annular exhaust-port $b$ connects the passages $g'$ $g'$ by means of the two two-way reversing-cocks $g^2$ with the exhaust $f$. These ports $b$ $b$ are divided by two portions of the body of the casing through which the passages $b^\times$ $b^\times$ pass. These passages form continuations of the openings in the cocks $g^2$ and connect these openings with the exhaust-channel $a^4$ of the valve $a^2$. (See Fig. 11.) Two parts of the lower section of plug-valve $d$ are cut away, as shown in plan and elevation, Fig. 7. The inner conical plug-valve $c$ is provided with two wings or feathers $c'$, which occupy portion of the spaces formed by cutting away parts of the lower portion of outer plug-valve $d$. The partial turning of said plug-valve $c$ by the handle $c^2$ enables the steam to be cut off at any desired point of stroke of piston, while the handle $d^2$, operating the outer plug $d$, together with the two reversing-cocks $g^2$, by means of the connecting-links $g^3$, secures any desired lead and enables the engine to be reversed.

The operation is as follows: Assuming the valve $a^2$ to be rotating in the direction of the arrow, steam will be admitted through the inlet-port $a^3$ into the space between the wings $c'$ and $d'$, (lower wings $c'$ and $d'$ on Fig. 9,) thence through port $b'$, leading therefrom into the circular passage $g'$ and through port or passage $g$ (lower port $g$ in the figure) into one end of the cylinder, driving the piston forward. The other end of the cylinder will be exhausting through upper port $g$ into upper portion of circular passage $g'$, thence through right-hand two-way cock $g^2$ into exhaust-channel $a^4$, into exhaust-passage $b$, and out through exhaust $f$. If now the plug-valve $d$ is turned so as to move the wings $d'$ to the other side of the ports $b'$—that is to say, in the same direction as that in which the valve $a^2$ is rotating—and at the same time the two two-way cocks $g^2$ are turned so as to communicate with the opposite portions of the circular passage $g'$, the lower port or passage $g$ (through which live steam was passing to behind the piston) will be open to exhaust through the right-hand cock $g^2$ into the exhaust-recesses $a^4$ and thence through exhaust-passage $b$ and out at exhaust $f$. At the same time live steam will pass through inlet $a^3$ into the space between the left-hand wing $c'$ and the upper wing $d'$, as will be clearly seen from the drawings, thence through upper port $b'$, leading therefrom, into upper portion of circular passage $g'$, through upper port or passage $g$ into the front end of the cylinder (which before was open to exhaust) and drive the piston rearward, thus effecting the reversing of the engine. The plug-valve $c$ may then be adjusted or turned by its handle $c^2$ so as to regulate the amount of cut-off by altering the space between the wings $c'$ and $d'$, communicating with the ports $b'$, over which space the inlet-port $a^3$ passes.

Having now described my invention, what I claim as new, and desire to secure by Letters Patent, is—

1. In combination with an engine, a valve-casing connected thereto, said casing having a portion connected with the fluid-supply, exhaust-passages leading from said portion, a rotary valve controlling the supply of fluid to said portion and the exhaust therefrom, two-way cocks also controlling the exhaust, a valve in said portion and means for turning the same to reverse the motion of the engine.

2. In combination with an engine, a valve-casing connected thereto, said casing having a portion connected with the fluid-supply, exhaust-passages leading from said portion, a rotary valve controlling the supply of fluid to said portion and the exhaust therefrom two-way cocks also controlling the exhaust, a reversing-valve in said portion, and a cut-off valve coöperating therewith.

3. In combination with an engine, a valve-casing connected thereto, said casing having a portion connected with the fluid-supply, exhaust-passages leading from said portion, a rotary valve controlling the supply of fluid to said portion and the exhaust therefrom, a reversing-valve in said portion having a hollow stem and wings projecting upwardly and outwardly therefrom, and a cut-off valve having its stem fitting in the hollow stem of the reversing-valve, said cut-off valve having an enlarged end with wings thereon, said end fitting between the wings on the reversing-valve, substantially as described.

In witness whereof I have hereunto set my hand in presence of two witnesses.

WILLIAM MAYNE.

Witnesses:
THOMAS ARTHUR DENNIS,
WILLIAM CONYERS.